United States Patent [19]

Bush

[11] Patent Number: 4,483,545
[45] Date of Patent: Nov. 20, 1984

[54] FIRE RESISTANT CONNECTIONS AND DOUBLE RIBBED SEALING MEANS THEREFOR

[75] Inventor: Robert E. Bush, Houston, Tex.
[73] Assignee: Gray Tool Company, Houston, Tex.
[21] Appl. No.: 469,354
[22] Filed: Feb. 24, 1983
[51] Int. Cl.³ .............................................. F16J 15/08
[52] U.S. Cl. .................................. 277/211; 277/22; 277/167.5; 277/235 A; 277/236
[58] Field of Search .............. 277/22, 26, 152, 206 R, 277/206 A, 207 R, 211, 236, 205, 123–125, 199, 188 R, 188 A, 192, 208, 193, 235 R, 167.5, 235 B, 207 A, 227, 228, 198, 165

[56] References Cited

U.S. PATENT DOCUMENTS

| | | | |
|---|---|---|---|
| 323,731 | 8/1885 | Phillips | 277/211 |
| 1,608,197 | 11/1926 | Bille | 277/236 |
| 1,819,036 | 8/1931 | Oberhuber | 277/236 X |
| 3,761,099 | 9/1973 | Hansson | 277/206 R X |
| 4,199,158 | 4/1980 | de Munck | 277/211 X |
| 4,390,186 | 6/1983 | McGee et al. | 277/208 X |

FOREIGN PATENT DOCUMENTS

| | | | |
|---|---|---|---|
| 2844906 | 4/1980 | Fed. Rep. of Germany | 277/205 |
| 712786 | 7/1954 | United Kingdom | 277/236 |
| 1025704 | 4/1966 | United Kingdom | 277/207 R |

Primary Examiner—Robert S. Ward
Attorney, Agent, or Firm—Arthur E. Fournier, Jr.

[57] ABSTRACT

A fire resistant connection (28) that embodies a sealing means (36) and that is operable for purposes of effectuating the establishment of a fire resistant seal between mating surfaces (32, 34), and in particular mating surfaces (32, 34) of the type that commonly are found to be present in wellhead and valve equipment (10). The subject fire resistant connection (28) includes mating seal surfaces (32, 34) and the aforementioned sealing means (36). The sealing means (36) comprises a seal ring (36), which includes a plurality of seal lips (38, 40) and a pair of scalloped ribs (42, 44), the latter (42, 44) being formed on the seal ring (36) so as to be located in interposed relation between a pair of adjacent seal lips (38, 40). Each of the plurality of seal lips (38, 40) is suitably configured so as to be positionable in sealing engagement with a corresponding one of the mating seal surfaces (32, 34), the latter (32, 34) embodying a configuration that is complementary in nature to that of the seal lip (38, 40) engaged thereby. Likewise, the pair of ribs (42, 44) are suitably configured such that when the seal lips (38, 40) are in sealing engagement with the mating seal surfaces (32, 34), the pair of ribs (42, 44) are also engaged by the mating seal surfaces (32, 34) and are locked in position thereby.

6 Claims, 2 Drawing Figures

FIRE RESISTANT CONNECTIONS AND DOUBLE RIBBED SEALING MEANS THEREFOR

CROSS REFERENCE TO RELATED APPLICATIONS

This application is hereby cross referenced to the following four patent applications which were commonly filed herewith and which are commonly assigned: U.S. patent application Ser. No. 469,358 filed Feb. 24, 1983 entitled "Fire Resistant Connections And T-Like Sealing Means Therefor", filed in the name of Frank C. Adamek; U.S. patent application Ser. No. 469,356 filed Feb. 24, 1983 entitled "Fire Resistant Connections And U-Like Sealing Means Therefor", filed in the name of Frank C. Adamek; U.S. patent application Ser. No. 469,357 filed Feb. 24, 1983 entitled "Fire Resistant Connections And Dovetail-Like Sealing Means Therefor", filed in the name of Robert E. Bush; and U.S. patent application Ser. No. 469,355 filed Feb. 24, 1983 entitled "Fire Resistant Connections Embodying Heat Transfer Means", filed in the names of Charles D. Bridges, et al.

BACKGROUND OF THE INVENTION

This invention relates to means for effecting connections between surfaces, and more particularly to means for establishing a fire resistant connection and seal between surfaces of the type that are known to exist in wellhead and valve equipment.

The fact that extreme service conditions are encountered in wellhead applications has long been recognized. Moreover, it has long been known that the nature of such extreme service conditions encompasses, by way of example and not limitation, conditions such as the presence of high and low temperature, sour gas, high fluid velocity, pressure cycling, thermal shock, and/or the existence of forces of vibration, bending, compression, tension or any combination of these forces. In an effort to provide equipment that would be suitable for employment in such wellhead applications, i.e., that would successfully withstand being subjected to extreme service conditions of this type, metal-to-metal seals have heretofore been employed for purposes of effectuating connections and seals in equipment designed to be used in wellhead applications of the aforedescribed type. This selection of metal-to-metal seals for use in this manner has been influenced to some extent by environmental and economic considerations. Moreover, the metal-to-metal seals that have actually been selected for use for this purpose have been of various designs. By way of illustration, reference may be had, among others, to U.S. Pat. No. 2,766,999, which issued on Oct. 16, 1956 to J. D. Watts et al., and/or to U.S. Pat. No. 4,214,763, which issued on July 29, 1980 to R. E. Latham for a showing of a metal-to-metal seal that is disclosed to be suitable for use in equipment, which is designed for employment in wellhead applications.

Although these earlier types of metal-to-metal seals when employed in equipment designed for use in wellhead applications have proven generally to be capable of withstanding the extreme service conditions associated with such applications, i.e., conditions of the sort that have been enumerated hereinbefore, these metal-to-metal seals were never intended to be fire resistant. That is, no requirement existed insofar as the design of these metal-to-metal seals was concerned that they embody the capability of maintaining sealability during periods of thermal expansion and contraction occasioned by the occurrence of wellhead fires. It is only more recently that the matter of fire resistance has come to be viewed as a consideration in the design of connections and seals of the type found in equipment that is intended for use in wellhead applications. Moreover, to some in the industry this matter of fire resistance has gone beyond the state of being simply a consideration, but rather has now risen to the level of being a requirement that future designs of metal-to-metal seals must satisfy.

For purposes of exemplifying what constitutes fire resistant wellhead equipment as this term is being employed herein, reference can be had at least insofar as 5,000 psig and 10,000 psig working pressure equipment is concerned to the statement of requirements that is embodied in American Petroleum Institute's RP6F "Modified". As set forth therein, 5,000 psig working pressure equipment must satisfy the following test criteria: flame temperature one inch from the wall—1100° C. (2000° F.); stabilization temperature within $3\frac{1}{2}$ hours—650° C. (1200° F.); high test pressure throughout the test—3750 psi; low test pressure throughout the charging test—500 psi; test media—water; hold period at stabilization temperature—one hour; valve backseat test pressure for oil service—100 psi; valve backseat test pressure for gas service—500 psi; allowable leakage—zero external leakage; and functional valve test after burn—replace stem assembly, open one time, zero external leakage allowed. With respect to 10,000 psig working pressure equipment, the test criteria that must be satisfied are as follows: flame temperature one inch from the wall—1100° C. (2000° F.); stabilization temperature within $3\frac{1}{2}$ hours—650° C. (1200° F.); high test pressure throughout the test—7500 psi; low test pressure throughout the test—500 psi; charging test media—water; hold period at stabilization temperature—one hour; valve backseat test pressure for oil service—100 psi; valve backseat test pressure for gas service—500 psi; allowable leakage—zero external leakage; and functional valve test after burn—replace stem assembly, open one time, zero external leakage allowed.

The high temperatures which are encountered during wellhead fires give rise to a variety of problems. Included among these are problems that can be linked to the rapid thermal heatup and cooldown of the material which is exposed to the wellhead fire, the expansion and/or contraction of the exposed material, and/or a loss in the properties which the exposed material exhibits. For ease of classification, however, the aforereferenced problems fall basically into two categories. Namely, there are those problems which relate to the structural characteristics exhibited by the wellhead equipment material upon being exposed to a wellhead fire, and there are those problems that relate to the capability of connections and seals in wellhead equipment to maintain their sealability when the wellhead equipment is subjected to a wellhead fire.

Addressing first the matter of the structural characteristics of wellhead equipment material, for purposes of rendering such material fire resistant, i.e., capable of satisfying the test criteria enumerated above for 5000 psig and 10,000 psig working pressure equipment, the loss of tensile strength exhibited thereby when exposed to a wellhead fire can be compensated for in several ways. First, advantage can be taken of the fact that API's RP6F "Modified" permits a twenty-five percent downrating to be had in the pressure limits which 5000 psig working pressure equipment must be capable of withstanding. Secondly, the pressure vessel walls of the equipment in question can be oversized. Accordingly, it has been found that this twenty-five percent downrating permitted by API's RP6F "Modified" coupled with the oversizing of the pressure vessel walls of the wellhead equipment is sufficient to compensate for the loss of the tensile strength that occurs when the wellhead equipment is exposed to elevated temperatures.

Although wellhead housings and valve housings become large when the walls thereof are oversized, i.e., when API type materials are employed therefor, such housings nevertheless remain within practical limits. Therefore, there is no necessity to make use of exotic steels, etc. for this type of equipment. This is not to say, though, that future developments in the area of materials research may not produce new cost effective, high strength alloys, which will enable a reduction to be had in the sizing of wellheads and valves of the type that fall within the category of 5000 psig working pressure equipment.

Turning now to the matter of the sealability of the connections and seals that are embodied in wellhead equipment, it is essential for the reasons that have been discussed previously herein that such connections and seals be effectuated through the use of metal-to-metal seals. On the other hand, however, if such metal-to-metal seals are to be capable of exhibiting adequate tensile strength at elevated temperatures the view has been taken that there must be utilized therein high strength materials as overlays or seal ring materials. Elastomers, as they are known today, are known to perform unsatisfactorily when employed under the sort of conditions to which wellhead equipment is subjected when a wellhead fire occurs. The one nonmetallic material which may have some merit for use in such applications is that which is referred to by those in this industry as "Grafoil".

By and large, therefore, it can thus be seen that in order to develop wellhead and valve equipment that is fire resistant, i.e., satisfies insofar as the principal requirements for fire resistance are concerned the statement of requirements that is embodied in API's RP6F "Modified", a need has existed to develop improved sealing techniques that would be suitable for use to effect seals that would maintain their sealability at elevated temperatures. More specifically, there has existed a need to develop improved high temperature sealing techniques that would be applicable for use in connection with both the tubular and annular seals that are to be found in wellhead equipment, and which would enable the latter equipment to withstand in terms of sealability the range of temperatures to which such equipment would commonly be exposed in the course of a wellhead fire. In this context, in order to develop such an improved high temperature sealing technique there would exist a need to address the following areas: the thermal and metallurgical characteristics of the materials involved, the relative movement that occurs between the mating parts, and the sliding action that the seal must endure.

Attempts at the development of such high temperature sealing techniques have been undertaken. Further, the focus thereof at the outset was predicated on the following notions. Foremost was the notion that a clamp connection because of its mass would prove to be beneficial insofar as a fire resistant connection is concerned. Moreover, it was felt that such a clamp connection would probably prove to be the only suitable connection for use in wellhead and valve equipment that was designed to be fire resistant. Accordingly, considerable time and effort was devoted to the development of a suitable clamp connection that would maintain its sealability at elevated temperatures. However, not only did the mass of a large enhanced clamp prove to be detrimental to heat exchange properties of the wellhead and valve equipment per se, but indeed proved to be uncontrollable in terms of torsional deflection and permanent set. In turn, the latter prevented retention of any seal that was dependent upon the large clamp connection as a holding device.

As a result of the realization of the above, the development of a studded clamp connection was undertaken. However, the unfavorable heat transfer properties of the added mass of the large clamp soon led to the abandonment of the clamp itself. This was done principally so that a more favorable heat transfer could be realized in a less irregular surface surrounding the wellhead housing. It was then concluded that in the context of attempting to render wellhead and valve equipment fire resistant large clamp connections should not be utilized.

Enhanced flange connections have since been developed which are capable of maintaining the required seal contact force and connection stability. Furthermore, it is practical to prepare such an enhanced flange connection with a hub profile that may be utilized during the drilling operation. Notwithstanding this though it is still strongly recommended that large clamps not be utilized in wellhead and valve equipment that is intended to be designated as being fire resistant.

Thus, to summarize, it has been concluded from analytical and test results that API type materials are suitable for use in forming pressure containing members of wellhead housings, valve bodies, and bonnets. Further, it is viewed as being practical to construct valve bodies and wellhead housings of such materials. That is, the use of such materials for this purpose does not lead to enormous enlargement of the equipment to the point of being impractical. On the other hand, however, it must be recognized that API type materials are not suitable for use in performing a sealing function. Accordingly, it is essential that within any wellhead and valve equipment housings that overlays and seal rings of high strength materials be inserted. Furthermore, these overlays and seal rings of high strength material must be of sufficient size and integrity to withstand the loading forces necessary to effect the sealing function. In addition, the materials utilized in this connection in the overlays and in the seal rings must of necessity be selected for compatibility, for their elevated temperature strength, and of great importance, their thermal conductivity. Namely, it is very important that the material selected for use in these sealing areas be compatible from the standpoint of thermal expansion and contraction, corrositivity, weldability and gall resistance. However, even when the above criteria have been satisfied, there still remains a need to provide a high temperature seal, which in terms of its design as contrasted to the matter of the materials from which it is formed, is suitable for use in wellhead and valve equipment that may be subjected to elevated temperatures of the type that are experienced during the course of a wellhead fire. That is, a need has been evidenced for a seal design wherein a seal constructed in accordance therewith would when employed in wellhead and valve equipment be characterized by the fact that it possessed the capability of maintaining its sealability even when the wellhead and valve equipment in which it was embodied was involved in a wellhead fire.

In particular, a need has been evidenced for a seal embodying a design which would render the seal especially suitable for use as a bonnet seal. More specifically, it is desired to provide such a seal embodying a design which enables the seal to be employed in a valve bonnet notwithstanding the fact that limitations are imposed thereon by virtue of the proximity of the bonnet bolting circle to the diameter of the seal.

It is, therefore, an object of the present invention to provide a new and improved connection, i.e., a seal, suitable for employment in wellhead and valve equipment.

It is another object of the present invention to provide such a connection, i.e., a seal, which when employed in wellhead and valve equipment is capable of withstanding the conditions imposed thereupon during the occurrence of a wellhead fire.

It is still another object of the present invention to provide such a connection, i.e., a seal, which is characterized in that it exhibits adequate tensile strength even at the elevated temperatures that exist when a wellhead fire occurs.

A further object of the present invention is to provide such a connection, i.e., a seal, which is characterized in that it exhibits the capability of being able to maintain its sealability even at the elevated temperatures that exist when a wellhead fire occurs.

A still further object of the present invention is to provide sealing means of unique design which is particularly suited for use in a connection, i.e., a seal, of the sort that is intended for employment in wellhead and valve equipment of the type that is designed to be denoted as being fire resistant.

Yet another object of the present invention is to provide sealing means in the form of a double ribbed seal ring which when employed as a component of a connection, i.e., a seal, in wellhead and valve equipment is operative to enable the connection, i.e., the seal, to maintain its sealability when the equipment in which the connection, i.e., the seal, is embodied is subjected to the conditions that are associated with the occurrence of a wellhead fire.

Yet still another object of the present invention is to provide such a connection, i.e., a seal, embodying such a double ribbed seal ring which is relatively inexpensive to provide and easy to employ, while yet being capable of providing reliable and effective service even when exposed to the conditions that exist when a wellhead fire occurs.

SUMMARY OF THE INVENTION

In accordance with the present invention there is provided a new and improved fire resistant connection, i.e., seal, that embodies a double ribbed sealing means and which is operative for purposes of effectuating the establishment of a fire resistant connection and seal between mating surfaces, particularly mating surfaces of the type that are commonly encountered in wellhead and valve equipment. The subject connection, i.e., seal, encompasses the suitably configured mating sealing surfaces, and the aforereferenced double ribbed sealing means. The latter double ribbed sealing means comprises a double ribbed seal ring which includes a pair of substantially planar seal lips that are suitably spaced one from another and which lie within a common plane. Additionally, the subject double ribbed seal ring includes a pair of ribs that extend outwardly from a common base. The latter base is formed on the seal ring so as to be located between and substantially equidistant from the pair of planar seal lips. Each of the pair of ribs has a multiplicity of scallops equally spaced around the circumference thereof. The function of these scallops is to provide clearance for bolts when the subject connection, i.e., seal, is being utilized as a valve bonnet seal. When the subject connection, i.e., seal, is in its assembled, i.e., sealing, condition, the planar seal lips of the double ribbed seal ring are positioned in sealing engagement with complementary configured portions of the mating sealing surfaces. Mechanical loading is provided by the existence of an interference fit between the outside diameter of the seal ring and the inside diameter of the mating sealing surfaces. The double ribs with their common base provide a thickened rib section which serves to enable the seal lips to function independently. Preferably, the seal lips are coated with a suitable antigalling material in order to minimize the extent to which the seal lips suffer galling, the latter being attributable to the high contact forces to which the seal lips are subjected in order to maintain the sealability of the connection, i.e., seal, throughout the thermal cycle occasioned, for example, by the occurrence of a wellhead fire.

DESCRIPTION OF THE PREFERRED EMBODIMENT

Figure 1:
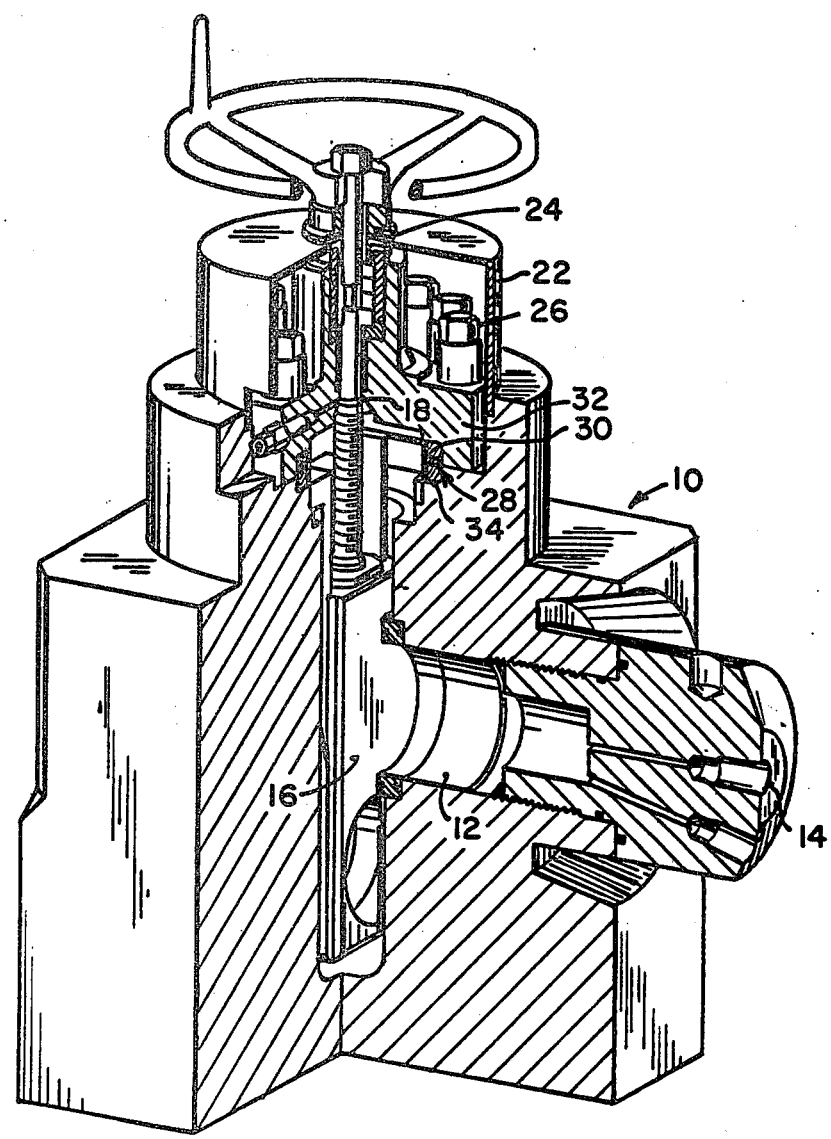
FIG. 1 is a schematic representation of a valve test assembly depicting emplaced therewithin in its operative, i.e., sealing, state a fire resistant connection, i.e., seal, constructed in accordance with the present invention.

Referring now to the drawing, and more particularly to FIG. 1 thereof, there is to be found depicted therein a valve test assembly, generally designated by the reference numeral 10. The valve test assembly 10 embodies all of the components of a gate valve that would be utilized in a fire resistant assembly. It will be noted, however, that only one inlet, seen at 12 in FIG. 1, is provided and this is utilized to insert monitoring and test ports, such as the ports identified by the reference numeral 14 in FIG. 1. Since it is not necessary that the valve be actuated during the test for fire resistance, i.e., to test whether the requirements set forth in American Petroleum Institute's API RP6F "Modified" have been satisfied, there is no need for flowthrough conduit testing.

The valve test assembly 10 must, of necessity, contain all of the components of a gate valve. Accordingly, as shown in FIG. 1, the gate-seal assembly 16 embodies a standard split gate, metal-to-metal sealing design. The nonrising stem, which is attached to the gate assembly 16 by a standard drive nut, contains a metal-to-metal sealing backseat 18 that is conventional in this type of valve. The backseat 18 is withheld during operation from contact with its seat by the eutectic spacer 20. In normal operation, the eutectic spacer 20 prevents the backseat 18 from wearing due to engagement by the latter with its seat. Moreover, when desired, the valve may be placed in engagement with the backseat 18 by backing off the retainer gland, the latter constitutes an integral part of the heat detection shield and retainer gland, which is denoted generally in FIG. 1 by the reference numeral 22.

Upon assembly, the backseat drive spring 24 is preloaded so that upon removal of the eutectic spacer 20 by fumation, an upward force is imparted to the entire stem assembly which drives the backseat 18 to the closed position even though zero pressure may exist in the valve cavity. The eutectic spacer 20 and the backseat drive spring 24 represent modifications that have been made to a standard valve for purposes of rendering the latter suitable for use in applications that require a valve that is fire resistant, i.e., is capable of satisfying the requirements that are set forth in API RP6F "Modified". A standard valve embodies a spacer but it is not a eutectic. Also, the backseat design as depicted in FIG. 1 is the same as that which is found in a standard valve, and this backseat 18 will function from cavity pressure when the gland retainer nut is backed off to permit the stem to move upward so that it will seal. However, more than zero pressure is required to be present in the cavity in the case of a standard valve before the aforedescribed movement of the stem will take place. The addition of the backseat drive spring 24 depicted in FIG. 1 represents the modification to the standard valve which enables the valve to function at zero cavity pressure.

With the valve on backseat and the gate in the closed position, all penetrations to the valve cavity are sealed by means of metal-to-metal seals. This is as it should be in the case of a valve that is designed to be designated as being fire resistant. It is to be recognized that the resilient packing seals in the stem packing area will be destroyed at elevated temperatures of the nature which are known to exist during a wellhead fire, as will the bearing assemblies be destroyed. Leakage from the valve bore and cavity is prevented, however, by the presence of the backseat seal and the primary gate-seat seal. The heat deflection shield and retainer gland 22 represents an additional modification to a standard valve which provides added protection to the bonnet bolting, the latter being denoted generally by the reference numeral 26 in FIG. 1. Indeed, special attention is paid to the bonnet bolting 26 in that specialized materials are employed therefor and shrouded bolting is utilized.

During test, pressure is maintained on the upstream side of the gate in the valve cavity via a pressure port (not shown) suitably provided for this purpose in the valve body. Leakage is monitored through the ports denoted by the reference numeral 14 in FIG. 1. Pressurization is maintained throughout the test.

The eutectic spacer 20 is preferably designed to fail at 275° F. However, this temperature may be adjusted to any other desired temperature. Upon gasification the stem is driven to backseat 18 by the spring force of the backseat drive spring 24. This normally occurs during the early portion of the burning cycle of the test for fire resistance, and well before the destruction occurs of the stem packing assembly that retains the normal pressure seal around the valve stem.

Thereafter, throughout the test cycle, the valve cavity remains sealed by the metal-to-metal backseat seal and the metal-to-metal gate-seat seal. It should be pointed out that thermocouples (not shown) are inserted in the valve test assembly 10, preferably at three points at each seal surface in order to permit the thermal monitoring thereof. The bonnet seal, denoted generally in FIG. 1 by the reference numeral 28, comprises a metal-to-metal seal that replaces the standard bonnet seal in a standard valve. Moreover, the seal area around the bonnet seal 28 is preferably overlaid with suitable hardfaced material, the latter being identified in FIG. 1 by the reference numeral 30.

Upon completion of the thermal cycle, it is a test requirement that the valve be opened. However, before attempting to actuate the valve, the stem packing assembly must be replaced, so that pressure is retained in the valve cavity as the backseat seal is reached.

A description will now be had in more detail of the connection, i.e., seal, which is denoted by the reference numeral 28 in FIG. 1, and which forms the subject matter of the present invention. For this purpose, reference will be had to both FIGS. 1 and 2 of the drawing. As best understood with reference to FIG. 1, the connection, i.e., seal, 28 encompasses a pair of mating surfaces identified by the reference numerals 32 and 34 in FIG. 1, and a double ribbed sealing means, the latter being identified by the reference numeral 36 in FIG. 2.

Figure 2:
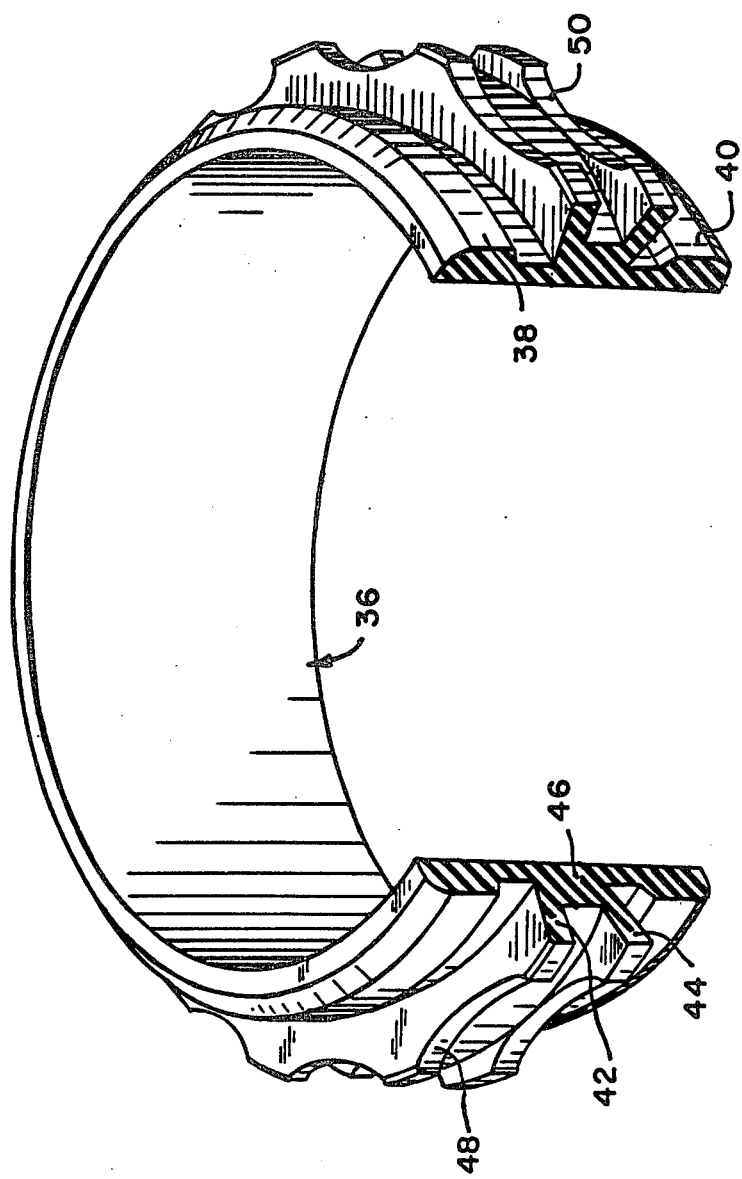
FIG. 2 is a perspective view on an enlarged scale and with a portion cutaway of the seal ring of a fire resistant connection, i.e., seal, constructed in accordance with the present invention.

The double ribbed sealing means 36, as best understood with reference to FIG. 2 of the drawing, takes the form of a double ribbed seal ring. To this end, the double ribbed seal ring 36 as shown in FIG. 2 is substantially cylindrical in nature. Further, the double ribbed seal ring 36 is provied with a pair of planar seal lips 38 and 40 that are each formed on the outer surface thereof so as to project slightly therefrom. Moreover, the seal lips 38 and 40 are each suitably dimensioned so as to be substantially identical one to another in size. As such, the seal lips 38 and 40 function to define a common plane, i.e., lie within the same plane.

Continuing with the description of the double ribbed seal ring 36, the latter as shown in FIG. 2 is provided with a first rib 42 and a second rib 44. Both the first rib 42 and the second rib 44 project outwardly from a common base 46. The latter base 46 in turn projects outwardly from the seal ring 36 on the same side thereof as the planar seal lips 38 and 40. Moreover, the base 46 and thereby the first and second ribs 42 and 44 are all suitably positioned on the seal ring 36 so as to be located substantially equidistant between the pair of planar seal lips 38 and 40. Further, it can be seen from FIG. 2 that the first rib 42 and the second rib 44 diverge one from another. That is, the free ends of the first rib 42 and the second rib 44 are positioned further apart relative to each other than are the ends of the first rib 42 and the second rib 44 that are joined to the base 46. Completing the description of the double ribbed seal ring 36, the first rib 42 and the second rib 44 are each provided with a multiplicity of suitably spaced scallops 48 and 50, respectively, formed around the circumference thereof. Further, the scallops 48 of the first rib 42 and the scallops 50 of the second rib 44 are all suitably aligned one with another in order to permit bolts to be passed therethrough when the seal ring 36 is being employed as part of a bonnet seal, i.e., in the manner of the seal identified at 28 in FIG. 1.

With further reference in particular to FIG. 1 of the drawing, when the connection, i.e., seal, 28 occupies its sealing position, the seal lips 38 and 40 contact the mating surfaces 32 and 34, and more particularly planar portions with which the latter are suitably provided. That is, the seal lips 38 and 40 contact portions of the mating sealing surfaces 32 and 34 which like the seal lips 38 and 40 themselves are substantially planar in nature as well as being substantially cylindrical. Namely, the mating sealing surfaces 32 and 34 which the planar seal lips 38 and 40 are designed to contact each embody a configuration which is complementary in nature to the configuration of the planar seal lips 38 and 40. Further, when the mating sealing surfaces 32 and 34 are engaged in the final seal lock position thereof, the seal lips 38 and 40 are placed in a position of effecting an interference fit with the planar portions of the mating sealing surfaces 32 and 34. As such the seal lips 38 and 40 perform a sealing function. In addition, under this condition, the divergent first rib 42 and second rib 44 are each firmly locked into position within cavities that are suitably provided for this purpose in each of the mating sealing surfaces 32 and 34. To this end, the mating sealing surfaces 32 and 34 embody cavities that in terms of their configuration are complementary to the configuration of the first rib 42 and the second rib 44, respectively.

Continuing, the large mass comprised by the first rib 42, the second rib 44 and the base 46, i.e., the heighth times the width thereof, as compared to that of seal lips 38 and 40 enables two essential functions to be performed thereby. Namely, the ribs 42 and 44 and the base 46 function to stabilize the seal lips 38 and 40 such that the latter may function separately, i.e., independent of each other, as the need therefor may arise when the mating sealing surfaces 32 and 34 that are in contact therewith are subjected to thermal distortion. Secondly, the large mass of the ribs 42 and 44 and the base 46 enables the latter to function to provide effective heat transfer to the seal areas. From the above, it should be readily apparent that the maintenance of rib stability, i.e., stiffness, is very important.

It has been found to be necessary to coat the seal lips 38 and 40 with an anti-galling material because of the high contact forces which the seal 28 is required to maintain throughout a thermal cycle. To this end, any coating material which possesses good heat transfer properties as well as high gall resistance at 1200° F. is suitable for use for this purpose, such as silver.

In summary, it has been found that a connection, i.e., seal, constructed in the manner of the seal 28 will maintain its sealability at elevated temperatures of the type encountered during the occurrence of a wellhead fire notwithstanding the fact that the members which the seal 28 serves to connect may undergo axial movement. This is in contrast to prior art forms of metal-to-metal seals wherein due to the angular inclination of the surfaces thereof, relative axial movement tends to cause the mating sealing surfaces to separate and thereby renders the sealing actions of the metal-to-metal seal ineffective.

Radial movement of the members which the connection, i.e., seal, 28 serves to connect is not a problem because of the fact that the coefficients of expansion of the material from which these members are formed are chosen so as to be very similar. Accordingly, the amount of radial movement that occurs is so slight as to be insufficient to overcome the spring forces being exerted by the seal lips 38 and 40 of the seal 28 against the mating sealing surfaces 32 and 34.

Thus, in accordance with the present invention there has been provided a new and improved form of connection, i.e., seal, that is suitable for employment in wellhead and valve equipment. Moreover, the subject connection, i.e., seal, of the present invention when employed in wellhead and valve equipment is capable of withstanding the conditions imposed thereupon during the occurrence of a wellhead fire. In addition, in accord with the present invention a connection, i.e., seal, is provided which is characterized in that it exhibits adequate tensile strength even at the elevated temperatures that exist when a wellhead fire occurs. Further, the connection, i.e., seal, of the present invention is characterized in that it exhibits the capability of being able to maintain its sealability even at the elevated temperatures that exist when a wellhead fire occurs. Additionally, in accordance with the present invention a sealing means of unique design is provided which is particularly suited for use in a connection, i.e., seal, of the sort that is intended for employment in wellhead and valve equipment of the type that is designed to be denoted as being fire resistant. Also, the sealing means of the present invention takes the form of a double ribbed seal ring which when employed as a component of a connection, i.e., seal, in wellhead and valve equipment is operative to enable the connection, i.e., the seal, to maintain its sealability when the equipment in which the connection, i.e., the seal, is embodied is subjected to the conditions that are associated with the occurrence of a wellhead fire. Furthermore, in accord with the present invention a connection, i.e., seal, embodying such a double ribbed seal ring is provided which is relatively inexpensive to provide and easy to employ, while yet being capable of providing reliable and effective service even when exposed to the conditions that exist when a wellhead fire occurs.

While only one embodiment of my invention has been shown, it will be appreciated that modifications thereof, some of which have been alluded to hereinabove, may still be readily made thereto by those skilled in the art. I, therefore, intend by the appended claims to cover the modifications alluded to herein as well as all other modifications, which fall within the true spirit and scope of my invention.

What is claimed is:

1. A connection for effectuating the establishment of a fire resistant connection and seal between mating sealing surfaces comprising:
(a) a continuous seal ring including a base having a first face and a second face, a first seal lip formed integrally with said base so as to project outwardly to a slight extent from said first face of said base adjacent to one end of said base, said first seal lip terminating in a planar sealing surface, a second seal lip formed integrally with said base so as to project outwardly to a slight extent from said first face of said base adjacent to the other end of said base, said second seal lip terminating in a planar sealing surface, said planar sealing surface of said first seal lip and said planar sealing surface of said second seal lip each lying in the same plane, a pair of ribs formed integrally with said base so as to project outwardly from said first face of said base at a location therealong substantially equidistant from said first seal lip and said second seal lip, each of said pair of ribs defining a plane that extends generally perpendicular to said plane of said planar sealing surface of said first seal lip and of said planar sealing surface of said second seal lip, each of said pair of ribs tapering towards one another in the direction of said first face of said base, each of said pair of ribs having a plurality of equally spaced scallops formed therein with said plurality of scallops formed in one of said pair of ribs being aligned with said plurality of scallops formed in the other of said pair of ribs;

(b) a first mating sealing surface having a first portion embodying a configuration complementary to the configuration of said planar sealing surface of said first seal lips, said first mating sealing surface further having a second portion embodying a configuration complementary to the configuration of one of said pair of ribs;

(c) a second mating sealing surface having a first portion embodying a configuration complementary to the configuration of said planar sealing surface of said second seal lip, said second mating sealing surface further having a second portion embodying a configuration complementary to the configuration of the other of said pair of ribs;

(d) fastening means fastening said first mating sealing surface to said second mating sealing surface;

(e) said continuous seal ring when positioned relative to said first and second mating sealing surfaces for purposes of effectuating the establishment of a fire resistant connection and seal therewith having said planar sealing surface of said first seal lip positioned in sealing engagement with said first portion of said first mating surface, said planar sealing surface of said second seal lip positioned in sealing engagement with said first portion of said second mating surface, said pair of ribs clamped in interposed relation with said first and second mating sealing surfaces and with said one of said pair of ribs engaging said second portion of said first mating sealing surface and said other of said pair of ribs engaging said second portion of said second mating sealing surface, said plurality of scallops formed in each of said pair of ribs providing a clearance space for said fastening means that fasten said first mating sealing surface to said second mating sealing surface.

2. The connection as set forth in claim 1 wherein said planar sealing surface of said first seal lip and said planar sealing surface of said second seal lip are each coated with anti-galling material.

3. A continuous seal ring for use in effecting a fire resistant connection between mating sealing surfaces comprising: a member including a base having a first face and a second face, a first seal lip formed integrally with said base so as to project outwardly to a slight extent from said first face of said base adjacent to one end of said base, said first seal lip terminating in a planar sealing surface, a second seal lip formed integrally with said base so as to project outwardly to a slight extent from said first face of said base adjacent to the other end of said base, said second seal lip terminating in a planar sealing surface, said planar sealing surface of said first seal lip and said planar sealing surface of said second seal lip each lying in the same plane, a pair of ribs formed integrally with said base so as to project outwardly from said first face of said base at a location therealong substantially equidistant from said first seal lip and said second seal lip, each of said pair of ribs defining a plane that extends generally perpendicular to said plane of said planar sealing surface of said first seal lip and of said planar sealing surface of said second seal lip, each of said pair of ribs tapering towards one another in the direction of said first face of said base, each of said pair of ribs having a plurality of equally spaced scallops formed therein with said plurality of scallops formed in one of said pair of ribs being aligned with said plurality of scallops formed in the other of said pair of ribs such that when employed to effect a fire resistant connection between mating sealing surfaces said planar sealing surface of said first seal lip is positioned in sealing engagement with said first portion of said first mating surface, said planar sealing surface of said second seal lip is positioned in sealing engagement with said first portion of said second mating surface, said pair of ribs are clamped in interposed relation with said first and second mating sealing surfaces and with said one of said pair of ribs engaging said second portion of said first mating sealing surface and said other of said pair of ribs engaging said second portion of said second mating sealing surface, said plurality of scallops formed in each of said pair of ribs provides a clearance space for fastening means extending in juxtaposed relation to said continuous seal ring for purposes of fastening the first mating sealing surface to the second mating sealing surface.

4. The continuous seal ring as set forth in claim 3 wherein said planar sealing surface of said first seal lip and said planar sealing surface of said second seal lip are each coated with anti-galling material.

5. In wellhead equipment including first and second members fastened together by fastening means, the improvement comprising fire resistant connection means operative for connecting together the first and second members, said fire resistant connection means comprising:

(a) a continuous seal ring including a base having a first face and a second face, a first seal lip formed integrally with said base so as to project outwardly to a slight extent from said first face of said base adjacent to one end of said base, said first seal lip terminating in a planar sealing surface, a second seal lip formed integrally with said base so as to project outwardly to a slight extent from said first face of said base adjacent to the other end of said base, said second seal lip terminating in a planar sealing surface, said planar sealing surface of said first seal lip and said planar sealing surface of said second seal lip each lying in the same plane, a pair of ribs formed integrally with said base so as to project outwardly from said first face of said base at a location therealong substantially equidistant from said first seal lip and said second seal lip, each of said pair of ribs defining a plane that extends generally perpendicular to said plane of said planar sealing surface of said first seal lip and of said planar sealing surface of said second seal lip, each of said pair of ribs tapering towards one another in the direction of said first face of said base, each of said pair of ribs having a plurality of equally spaced scallops formed therein with said plurality of scallops formed in one of said pair of ribs being aligned with said plurality of scallops formed in the other of said pair of ribs;

(b) a first portion formed in the first member having a configuration complementary to the configuration of said planar sealing surface of said first seal lip and a second portion formed in the first member having a configuration complementary to the configuration of one of said pair of ribs;

(c) a first portion formed in the second member having a configuration complementary to the configuration of said planar sealing surface of said second seal lip and a second portion formed in the second member having a configuration complementary to the configuration of the other of said pair of ribs;

(d) said continuous seal ring when positioned relative to the first and second members for purposes of effectuating the establishment of a fire resistant connection therewith having said planar sealing surface of said first seal lip positioned in sealing engagement with said first portion of the first member, said planar sealing surface of said second seal lip positioned in sealing engagement with said first portion of the second member, said pair of ribs being clamped in interposed relation with the first and second members and with said one of said pair of ribs engaging said second portion of the first member and said other of said pair of ribs engaging said second portion of the second member, said plurality of scallops formed in each of said pair of ribs providing a clearance space for the fastening means that extend in juxtaposed relation to said continuous seal ring for purposes of fastening together the first and second members.

6. In wellhead equipment the improvement of fire resistant connection means as set forth in claim 5 wherein said planar sealing surface of said first seal lip and said planar sealing surface of said second seal lip are each coated with anti-galling material.

* * * * *